United States Patent [19]

Browall

[11] 4,156,597

[45] May 29, 1979

[54] ULTRATHIN POLYETHERIMIDE MEMBRANE AND GAS SEPARATION PROCESS

[75] Inventor: Warella R. Browall, Scotia, N.Y.

[73] Assignee: General Electric Company, Schenectady, N.Y.

[21] Appl. No.: 836,084

[22] Filed: Sep. 23, 1977

[51] Int. Cl.² ............................................. B01D 59/12
[52] U.S. Cl. ......................................... 55/16; 55/66; 55/68; 55/70
[58] Field of Search .................. 55/16, 68, 70, 158, 55/66, 68; 210/23 H, 23 F, 500 M; 260/47 CP

[56] References Cited

U.S. PATENT DOCUMENTS

| | | | |
|---|---|---|---|
| 3,847,867 | 11/1974 | Heath et al. | 260/47 CP |
| 3,857,782 | 12/1974 | Crowley | 210/500 M X |
| 3,892,665 | 7/1975 | Steigelmann et al. | 210/500 M X |
| 3,899,309 | 8/1975 | Hoehn et al. | 55/16 |
| 3,930,990 | 1/1976 | Brun et al. | 55/16 X |
| 3,951,815 | 4/1976 | Wrasidlo | 210/500 M |
| 3,979,190 | 9/1976 | Hedman | 210/16 X |
| 3,992,495 | 11/1976 | Sano et al. | 210/500 M X |
| 4,033,731 | 7/1977 | Bargain et al. | 55/16 |
| 4,039,440 | 8/1977 | Cadotte | 210/500 M X |
| 4,071,590 | 1/1978 | Strathmann | 210/500 M X |

*Primary Examiner*—Robert H. Spitzer
*Attorney, Agent, or Firm*—Richard G. Jackson; Joseph T. Cohen; Leo I. MaLossi

[57] ABSTRACT

Disclosed is an ultrathin permselective polyetherimide membrane having an average thickness of less than about 10 microns and formed of a polymeric composition comprising a polyetherimide prepared by reacting metaphenylenediamine and certain aromatic bis(ether anhydride)s. A gas separation process employing the membrane is also disclosed.

11 Claims, No Drawings

ULTRATHIN POLYETHERIMIDE MEMBRANE AND GAS SEPARATION PROCESS

BACKGROUND OF THE INVENTION

This invention relates to an ultrathin permselective polyetherimide membrane and a gas separation process employing the membrane.

Methods for preparing very thin polymeric films are described in U.S. Pat. No. 3,580,841 (Cadotte, et al.) at column 5, line 54 to column 6, line 29, U.S. Pat. No. 3,767,737 (Lundstrom), Canadian J. Chem. 33, 15 (1955) (Pate and Yaffee article entitled "A New Material and Techniques for Fabrication and Measurement for Very Thin Films for Use in $4\pi$-Counting"), and in U.S. Patent Application Ser. No. 536,650 (Ward), filed Dec. 26, 1974, assigned to the assignee hereof and incorporated herein by reference.

Polyetherimides C.) by reacting certain aromatic bis(ether anhydrides) and organic diamines are described in U.S. Pat. No. 3,847,867 (Heath and Wirth). A high-temperature method (greater than 130° C.) for making such polyetherimides is described in U.S. Pat. No. 3,991,004 (Takekoshi et al.), which issued on a continuation-in-part of Application Ser. No. 319,371, filed Dec. 22, 1972. As described generally in the Heath et al. patent, the polyetherimides disclosed therein, when made by the high-temperature method disclosed in the last-mentioned application, can be cast from an organic solvent solution to a thermoplastic film. In Example 5 of Heath et al., preparation of a flexible film is described by doctor blading onto a glass slide to a thickness of 1 mil a mixture of 2,2-bis[4-(3,4-dicarboxyphenoxy)phenyl] propane dianhydride (4,4'-BPADA), 4,4-diamino-dipenyl ether (ODA), and dimethylacetamide (after stirring at ambient temperature for three hours) and thereafter evaporating the solvent. Example 6 thereof sets forth a similar preparation of a related film using 2,2-bis[4-(2,3-dicarboxyphenoxy)phenyl] propane dianhydride (3,3'-BPADA), ODA, and dimethylformamide as solvent.

However, the prior art does not disclose ultrathin (i.e., less than about 10 microns in thickness) permselective membranes formed from polyetherimides prepared from BPADA and meta-phenylene diamine (m-PD).

It has now been found by practice of the present invention that such ultrathin permselective polyetherimide membranes can be formed in simple efficient manner. The resulting membranes are found to have high permeabilities to a variety of gases. These membranes may be usefully and effectively employed to effect selective removal of such gases from mixtures thereof with other gases.

DESCRIPTION OF INVENTION

Generally stated, in one aspect, this invention provides an ultrathin permselective polyetherimide membrane having an average thickness of less than about 10 microns and formed of a polymeric composition comprising a polyetherimide consisting essentially of repeating units of the following formula:

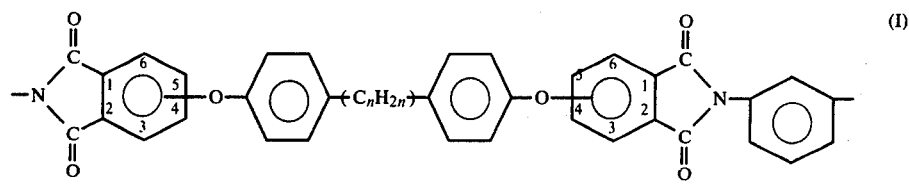

wherein n is an integer from 1–8 and the oxygen atoms linking the phenylene and phthalimide rings are in the 3,3'; 4,4'; or 3,4' positions or mixtures thereof on the phthalimide rings. Preferably n is from 1 to 5.

In a preferred embodiment the $-\!(C_nH_{2n})\!-$ group is $-C(CH_3)_2-$. In this embodiment, the polyetherimide may be formed, for example, by reacting BPADA and m-PD.

In another aspect, generally stated, this invention provides a process for selectively removing a gaseous component from a gaseous mixture containing the component. The process comprises contacting a major surface of the above described membrane with a gaseous mixture comprising at least two gaseous components selected from the group consisting of $N_2, C_2H_4, A, CH_4, CO, O_2, CO_2, H_2$, and $NH_3$ to effect selective removal from the mixture of the gaseous component having the highest permeability (of the components present) with respect to the membrane. Permeability of the membrane to the gases increases in the order given. The process results in formation of two gaseous mixtures which are enriched and relatively depleted, respectively, in the highest permeability gas. Either or both of the resulting gaseous mixtures may be recovered, as desired.

DETAILED DESCRIPTION OF THE INVENTION AND OF THE MANNER AND PROCESS OF MAKING AND USING IT

The permselective (semipermeable) polyetherimide (PEI) membranes of the present invention are substantially non-porous and ultrathin, i.e., less than about 10 microns (0.4 mil) and preferably less than about 1 micron and more preferably less than about 1000 angstroms (0.1 micron) in thickness. These ultrathin membranes enhance gas separation performance in that resistance to permeation of gaseous components decreases with decreasing membrane thickness.

It is found that polymeric compositions comprising the PEI of formula I above can be dissolved to form casting solutions which spontaneously spread over liquid substrates to form ultrathin PEI-containing membranes of this invention. Membranes of the present invention exhibit high absolute permeabilities to the gases set out above, providing good gas separation with minimum total membrane area.

The ultrathin non-porous membranes may be prepared by the process of the above Ward application by casting on a confined liquid surface. A pair of moveable longitudinally extending barriers intially spaced apart a small distance and in contact with the liquid surface are employed first to accommodate the casting solution therebetween and second by relative separation thereof to controllably permit spreading of the spontaneously spreadable casting solution over the surface of the film-support liquid. Water is the preferred film-support liquid.

Removal of the membrane or film from the surface of the casting substrate in a manner substantially free from tensile stress is best accomplished by the use of vacuum pickup on a microporous surface designed to serve as a substrate for the membrane or laminations thereof. Apparatus for the membrane pickup in its simplest form consists of a closed chamber having one porous wall (e.g., sintered metal particles) at least the size of the area of membrane to be recovered. The vacuum is drawn on the chamber after the porous wall has been covered with a layer of microporous substrate (e.g., Celgard ® microporous polypropylene-Celanese Plastics Co.; Millipore ® ultrafiltration membrane; Selectron™ membrane filter; and, preferably microporous Lexan ® polycarbonate) and the substrate is brought into contact with the developed membrane. In this way 80% or more of the solidified ultrathin membrane can be recovered. Subsequent membrane layers may be picked up in the same manner with each new layer sticking to the layer last deposited. Bubbles of gas trapped between layers may be gradually withdrawn by permeation and the membrane adjusts itself, shrinking as the gas leaves.

The present membrane may be formed of the PEI of formula I above, interpolymers with minor amounts, e.g., up to 10 or more per cent by weight of other monomers interpolymerizable with the reactants employed in forming the PEI, or mixtures thereof with various non-deleterious additives, which may be other polymers. The PEI of formula I is described generally in the above Heath et al. patent and may be prepared, for example, as described in the above Takekoshi et al. patent and preferably as described by Banucci et al. in U.S. Patent Application Ser. No. 755,686 filed Dec. 30, 1976, now U.S. Pat. No. 4,073,773.

In a preferred embodiment the $-(C_nH_{2n})-$ group is $-C(CH_3)_2-$. In this embodiment, the PEI may be formed, for example, by reacting BPADA and m-PD. The PEI preferred herein is prepared by reacting 4,4'-BPADA and m-PD to form a polymer represented by formula I wherein the $-(C_nH_{2n})-$ group is $-C(CH_3)_2-$ and the oxygen atoms linking the phenylene and phthalimide rings are in the 4,4' positions.

The solvent for the casting solution may be selected from normally liquid hydrocarbon organic compounds having, e.g., from 1-10 carbon atoms, and such compounds containing, e.g., halogen, nitrogen, oxygen or sulphur atoms and mixtures of the foregoing atoms and compounds. The solvent is preferably immiscible with the support liquid used and preferably has a normal boiling point of at least about 40° C. Methylene chloride and chloroform are generally good solvents. Methylene chloride is preferred.

The PEI may have any suitable $\bar{M}_w$ (weight average molecular weight), e.g., from aout 10,000 to about 100,000 and preferably from about 30,000 to about 60,000.

The membrane is preferably substantially uniform in thickness, a characteristic which may be imparted by preparation thereof using the barrier-rod technique of the Ward application. When casting on a liquid substrate, the surface thereof is preferably first substantially freed of dust and other foreign matter and the casting solution is preferably filtered to remove insolubles to aid in forming the membrane substantially free of through-holes. The casting solution may include the polymer in moderately high concentration, e.g., about 1-7%.

The present membranes exhibit an $O_2/N_2$ separation factor (ratio of $O_2$ permeability to $N_2$ permeability) having a value of at least about 4.

In general the membranes of this invention are characterized with excellent resistance to flux decay. As used herein flux decay means a decrease in the permeability of the membrane to one or more gases, e.g., $O_2, N_2$ and others, over a period of time. A number of non-polymeric membranes which may otherwise be commercially attractive for separating oxygen gas from nitrogen gas are not entirely satisfactory from the standpoint of resistance to flux decay.

Practice of the present invention is further illustrated by the following non-limiting examples. Throughout this description and in the claims that follow, all parts, ratios, percentages and the like given are by weight unless indicated otherwise. (Separation factors are based on volumetric permeabilities). The polyetherimide used in the examples hereof was prepared substatially according to the procedure set forth in Example 5 of allowed co-pending application U.S. Ser. No. 755,686 (Banucci et al.), filed Dec. 30, 1976, now U.S. Pat. No. 4,073,773, assigned to the assignee hereof and incorporated herein by reference, using approximately equimolar amounts of 4,4'-BPADA and m-PD. The resulting polymer had a $\bar{M}_w$ of about 46,200 and a $\bar{M}_n$ (number average molecular weight) of about 22,200, both as determined by gel permeation chromatography, and a corresponding polydispersity (ratio of $\bar{M}_w$ to $\bar{M}_n$) of about 2.08. This m-PD/BPADA PEI polymer can be represented by formula I above wherein the $-(C_nH_{2n})-$ group is $-C(CH_3)_2-$ and the linking oxygen atoms are in the 4,4' positions.

EXAMPLE 1

A substantially hole-free m-PD/BPADA PEI membrane, circular and about 3" in diameter, was prepared by depositing a drop (about 0.005 cc) of a solution of approximately 0.1 to 0.3 gram of the above-identified PEI in 5 cc of methylene chloride onto the edge of the surface of the bath of distilled water contained in a 4" diameter petri dish. The surface of the bath was slightly above the rim of the dish, the outer edge of the surface curving slightly downwardly to the rim. the solution was deposited at about 23° C. from a hypodermic needle held 2-3 mm above the water surface which was at room temperature (about 23° C.) and 14.7 psia. The drop quickly and spontaneously spread over the water surface, desolvated and formed a substantially non-porous solid membrane of about 300 angstroms (0.03 micron) in thickness. After making the membrane, a portion thereof was picked up by gently placing thereon a layer of saran having a ¼" diameter through-hole and lifting the resulting membrane-saran composite. The membrane did not break or rupture during pickup, thus evidencing surprisingly high membrane strength. Examination of the membrane under a microscope and under dark field illumination showed that it was completely black except where there were visible solid inclusions, and was substantially free of pinholes and crystallites.

EXAMPLE 2

A series of m-PD/4,4'-BPADA PEI membranes, each about 7.5 microns (0.3 mil) in thickness were prepared as next described, the procedure being repeated for each membrane. A 4% solution of the above-identified PEI in methylene chloride was filtered through a Millipore ® GSWP 02500 microporous filter. About 5 cc of the filtered solution was deposited onto a glass plate, and spread thereover using a doctor blade at a nominal 5-mil blade setting. The solution was allowed to desolvate in air at about 23° C. and 14.7 psia, and the resulting PEI membrane was floated off the glass plate onto the surface of a water bath. The membrane was recovered from the water bath by picking it up by hand, laid on absorbent filter paper, allowed to dry in air at room temperature, and cut to a desired size for subsequent testing (approximately 22 mm in diameter). Thereafter the dry membrane was placed onto, and in major surface to major surface contact with, a similarly sized Selectron B-13 microporous (0.05 micron pores) support membrane (commercially available from Schleicher and Schuell Co.). The thickness of the PEI film was determined by measurement with a micrometer. Each membrane was found to be substantially uniform in thickness and substantially free of through-holes.

Each of the resulting supported membranes was tested in a vacuum permeation test cell system wherein the unsupported side of the PEI membrane was supplied with one of the gases indicated in Table 1 below at about 23° C. In each test, the feed side pressure in the cell was an essentially constant value of about 25–60 cm Hg absolute and the vacuum side was less than 1 micron Hg absolute pressure. The absolute permeabilities of the membrane to each of the indicated gases, together with the separation factor (in this case the ratio obtained by dividing the permeability to a given gas by the permeability to nitrogen) and gas molecular weights appear in Table 1. As seen from the data, the permeabilties could not have been predicted from the molecular weights.

TABLE 1

| Gas | MW Of Gas | Separation Factor ($\alpha$) (Relative to $N_2$) | Absolute Pr $\times 10^{10}$ (cc* . cm thick) sec . cm$^2$ . cm Hg$\Delta P$ |
|---|---|---|---|
| $N_2$ | 28 | 1 | 0.361 |
| $C_2H_4$ | 28 | 1.01 | 0.365 |
| A | 40 | 1.38 | 0.498 |
| $CH_4$ | 16 | 1.39 | 0.502 |
| CO | 28 | 1.83 | 0.661 |
| $O_2$ | 32 | 5.30 | 1.91 |
| $CO_2$ | 44 | 24.5 | 8.84 |
| $H_2$ | 2 | 71.5 | 25.8 |
| $NH_3$ | 17 | 134 | 48.4 |

*cc at 0° C. and 760 mm Hg (i.e., cc at standard temperature and pressure, hereinafter referred to as cc-STP).

Based on the permeability data in Table 1, it was concluded that the membrane can be used in a process for selectively removing a gaseous component from a gaseous mixture containing any two or more of the gases shown therein. Any gas in the table will be selectively removed from a mixture thereof with any one or more gases which are higher in the table (i.e., having a relatively lower permeability or permeabilities than the component which will be removed relative thereto). Separation will be facilitated by maintaining a positive trans-membrane pressure difference from the feed or contacted side to the opposite side thereof. Such process of gas separation may be carried out at any suitable temperature. In general, a suitable temperature is from about −100° C. to about 200° C., and preferably from about 0° C. to about 100° C. Any suitable trans-membrane pressure difference (positive from feed to exit side) may be employed. In general, any trans-membrane pressure difference up to that corresponding to rupture of the membrane may be employed, e.g., up to about 200 psi. The upper limit on trans-membrane pressure will depend on the thickness of the membrane, lower thicknesses having lower upper limits. Employment of a porous or microporous support, e.g., porous Lexan ® polycarbonate as described by Salemme in U.S. Pat. No. 4,032,309 is recommended.

Especially important gaseous mixtures from which a gaseous component may be selectively removed are set forth in tabular form in Table 2 below, at least two gaseous components of which the mixture is comprised, the component which will be selectively removed, and which components such removal is relative to. It is well known that air is a mixture typically of approximately 21 volumetric percent oxygen, approximately 79 volumetric percent nitrogen and minor amount of various inert gases such as argon, helium, and the like.

TABLE 2

| Gaseous Mixture Comprising | Component Selectively Removed | Relative To |
|---|---|---|
| $H_2$ and CO | $H_2$ | CO |
| $O_2$ and $N_2$ | $O_2$ | $N_2$ |
| Air | $O_2$ | $N_2$ |
| $NH_3$, $H_2$ and $N_2$ | $NH_3$ | Each of $H_2$ and $N_2$ |
| $CO_2$, $N_2$ and $O_2$ | $CO_2$ | Each of $N_2$ and $O_2$ |
| $CO_2$ and $N_2$ | $CO_2$ | $N_2$ |
| $CO_2$ and at least one of $C_2H_4$ and $CH_4$ | $CO_2$ | $C_2H_4$ if present and $CH_4$ if present |

EXAMPLE 3

This example illustrates the excellent resistance to flux decay of the membrane prepared in Example 2. A continuous permeation test was carried out using the test conditions set forth in Example 2 above employing nitrogen as the feed gas at about 23° C. The permeability to $N_2$ was calculated from measurements of $N_2$ throughput rate (converted to cc-STP/sec) per unit area made after elapsed time of up to 8 days. The results are tabulated immediately below:

| Time (days) | Absolute Pr $\times 10^{10}$ |
|---|---|
| 1 | 0.358 |
| 2 | 0.348 |
| 4 | 0.376 |
| 8 | 0.340 |

The data shows that the membrane is characterized with substantial resistance to flux decay for extended periods of time.

EXAMPLE 4

A relatively large non-porous m-PD/BPADA PEI membrane having a substantially uniform thickness of about 200 angstroms was prepared using the barrier-rod casting procedure described in the Ward application Ser. No. 536,650. The casting solution used was an approximately 4% solution of the PEI in methylene chloride prepared by admixing the ingredients at room temperature with stirring.

About 0.08 cc of this casting solution was introduced at about 23° C. as droplets in and distributed itself along, the long narrow (about 1/16" wide) region defined between a pair of polytetrafluoroethylene-coated barriers in the apparatus illustrated in FIGS. 1–3 of the Ward application. The barriers extended over the edges of a generally rectangular water-filled tray (about 8.5" wide by about 12" long) and were in contact with the surface of this casting substrate which was at room temperature. One of the barriers was moved manually away from the other (keeping reasonably parallel thereto) at a speed of about 1 foot per minute. The resulting generally rectangular membrane was about 7" wide and about 10" long after slight shrinkage during desolvation. This membrane was picked up from the water employing the vacuum pickup apparatus and procedure described above, employing Selectron B-13 as the microporous substrate through which the vacuum was applied.

Thereafter a substantially identical PEI membrane was prepared by the foregoing casting procedure. The second membrane was picked up using the vacuum pickup apparatus having the first membrane in place, resulting in a composite membrane of two PEI layers in surface-to-surface contact and supported on the microporous substrate. Other membranes prepared as described above and of the same composition have been found to have excellent resistance to rupture upon being lifted from the surface of a water bath with a membrane-contacting saran layer having a ¼-½" through-hole positioned over the membrane. (The membrane portion opposite the hole is unsupported).

The thus supported composite membrane of this example was tested for the capability of effecting oxygen enrichment. Air containing, by analysis, 19% by volume oxygen gas at room temperature and about 14.7 psia pressure was supplied to one side of the membrane and a vacuum was drawn on the other side. Analyses of the mixture leaving the vacuum side showed about 20–21% by volume oxygen gas therein. However, the vacuum pump employed was found to have a leak through which surrounding air was drawn in and mixed with the cell effluent, this dilution of the product gas with air from which the feed supply was drawn resulted in deceptively low oxygen level read-outs at the point of analysis (oxygen analyzer located in the discharge line of the vacuum pump). It is expected that use of a leakfree vacuum pump in the foregoing test will result in an enriched air product containing at least 40% by volume of $O_2$.

The substantially non-porous ultrathin PEI membranes of this invention are commercially attractive for efficient gas separation in that the membranes are characterized with high gas through-put rates, good selectively, and substantial resistance to flux decay. These characteristics are especially significant for oxygen enrichment of air.

BEST MODE CONTEMPLATED

The best mode contemplated for carrying out this invention has been set forth in the description above, for example, by way of setting forth preferred film compositions and operating conditions, including but not limited to preferred ranges and values of amounts, temperatures, pressures, and other unobvious variables material to successfully practicing (including making and using) the invention in the best way contemplated at the time of executing this patent application.

It is to be understood that the foregoing description is given merely by way of illustration and that numerous modifications may be made therein without departing from the spirit or scope of the present invention.

What is claimed is:

1. A process for selectively removing a gaseous component from a gaseous mixture containing the component, which comprises contacting a major surface of an ultrathin permselective polyetherimide membrane having an average thickness of less than 10 microns and formed of a polymeric composition comprising a polyetherimide consisting essentially of repeating units of the following formula:

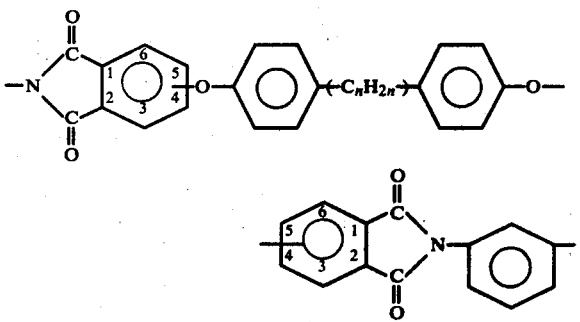

wherein n is an integer from 1–8 and the oxygen atoms linking the phenylene and phthalimide rings are in the 3,3'; 4,4'; 3,4' positions or mixtures thereof on the phthalimide rings with a gaseous mixture containing at least two gaseous components selected from the group consisting of $N_2, C_2H_4$, A, CO, $O_2$, $CO_2$, $H_2$ and $NH_3$ to effect selective removal from said mixture of the component having the highest permeability of the components present with respect to said membrane, said membrane increasing in permeability to said gaseous components in the order given.

2. The process of claim 1, further including recovering a gaseous mixture enriched in said highest permeability gas.

3. The process of claim 1, further including recovering a gaseous mixture relatively depleted in said highest permeability gas.

4. The process of claim 1, wherein the gaseous mixture comprises $H_2$ CO, and $H_2$ is selectively removed relative to CO.

5. The process of claim 1, wherein the gaseous mixture comprises $O_2$ and $N_2$, and $O_2$ is selectively removed relative to $N_2$.

6. The process of claim 1, wherein the gaseous mixture is air, and $O_2$ is selectively removed relative to $N_2$.

7. The process of claim 6, wherein oxygen enriched air is recovered.

8. The process of claim 1, wherein the gaseous mixture comprises $NH_3$, $H_2$ and $N_2$, and $NH_3$ is selectively removed relative to each of $H_2$ and $N_2$.

9. The process of claim 1, wherein the gaseous mixture comprises $CO_2$, $N_2$ and $O_2$, and $CO_2$ is selectively removed relative to each of $N_2$ and $O_2$.

10. The process of claim 1, wherein the gaseous mixture comprises $CO_2$ and $N_2$, and $CO_2$ is selectively removed relative to $N_2$.

11. The process of claim 1, wherein the gaseous mixture comprises $CO_2$ and $C_2H_4$, and $CO_2$ is selectively removed.